(12) United States Patent
Aas et al.

(10) Patent No.: US 9,986,360 B1
(45) Date of Patent: May 29, 2018

(54) AUTO-CALIBRATION OF RELATIVE POSITIONS OF MULTIPLE SPEAKER TRACKING SYSTEMS

(71) Applicant: Cisco Technology, Inc., San Jose, CA (US)

(72) Inventors: Rune Øistein Aas, Lysaker (NO); Kristian Tangeland, Oslo (NO); Erik Hellerud, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/631,327

(22) Filed: Jun. 23, 2017

(51) Int. Cl.
*H04N 7/15* (2006.01)
*H04S 7/00* (2006.01)
*H04R 29/00* (2006.01)
*H04M 3/56* (2006.01)

(52) U.S. Cl.
CPC ............ *H04S 7/301* (2013.01); *H04M 3/568* (2013.01); *H04N 7/15* (2013.01); *H04R 29/001* (2013.01)

(58) Field of Classification Search
None
See application file for complete search history.

(56) References Cited

U.S. PATENT DOCUMENTS

| | | | |
|---|---|---|---|
| 6,731,334 B1 | 5/2004 | Maeng et al. | |
| 7,015,954 B1 | 3/2006 | Foote et al. | |
| 7,403,217 B2 | 7/2008 | Schulz et al. | |
| 8,717,402 B2 * | 5/2014 | Cutler | H04N 7/142 348/14.01 |
| 9,274,597 B1 | 3/2016 | Karakotsios et al. | |
| 9,392,221 B2 | 7/2016 | Feng et al. | |
| 9,621,795 B1 * | 4/2017 | Whyte | H04N 5/23219 |
| 2015/0341719 A1 * | 11/2015 | Sun | H04R 1/32 381/92 |

* cited by examiner

*Primary Examiner* — Stella Woo
(74) *Attorney, Agent, or Firm* — Edell, Shapiro & Finnan, LLC

(57) ABSTRACT

A system that automatically calibrates multiple speaker tracking systems with respect to one another based on detection of an active speaker at a collaboration endpoint is presented herein. The system collects a first data point set of an active speaker at the collaboration endpoint using at least a first camera and a first microphone array. The system then receives a plurality of second data point sets from one or more secondary speaker tracking systems located at the collaboration endpoint. Once enough data points have been collected, a reference coordinate system is determined using the first data point set and the one or more second data point sets. Finally, after a reference coordinate system has been determined, the system generates the locations of the one or more secondary speaker tracking systems with respect to the first speaker tracking system.

20 Claims, 10 Drawing Sheets

AUTO-CALIBRATION OF RELATIVE POSITIONS OF MULTIPLE SPEAKER TRACKING SYSTEMS

TECHNICAL FIELD

The present disclosure relates to speaker tracking systems of a video conference endpoint.

BACKGROUND

Video conference endpoints are often deployed in conference rooms, and the video conference endpoints may include more than one speaker tracking system. Utilizing multiple speaker tracking systems at a collaboration endpoint, where each speaker tracking system views the conference room from a different angle, enables better framing of an active speaker by operating the speaker tracking system to which the active speaker is facing. In order to provide a better far-end experience through better framing of active speakers, the multiple speaker tracking systems may share and combine the data received by each system.

DESCRIPTION OF EXAMPLE EMBODIMENTS

Overview

Techniques presented herein relate to automatically calibrating multiple speaker tracking systems with respect to one another based on detection of an active speaker at a collaboration (video conference) endpoint. The system collects a first data point set of an active speaker at the collaboration endpoint using at least a first camera and a first microphone array. The system then receives a plurality of second data point sets from one or more secondary speaker tracking systems located at the collaboration endpoint. Once enough data points have been collected, a reference coordinate system is determined using the first data point set and the one or more second data point sets. Finally, after a reference coordinate system has been determined, the system generates the locations of the one or more secondary speaker tracking systems with respect to the first speaker tracking system.

EXAMPLE EMBODIMENTS

Figure 1:
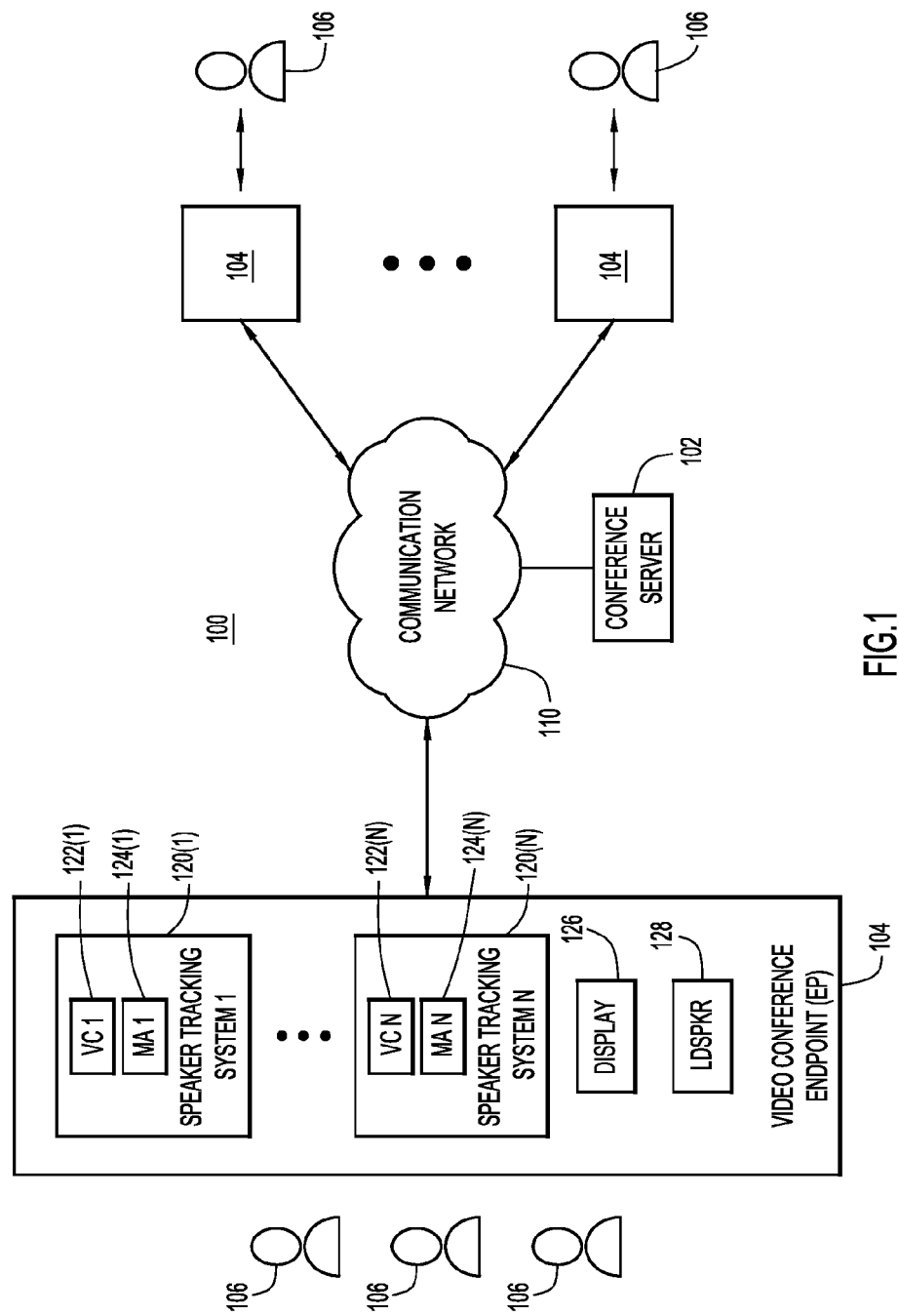
FIG. 1 is a block diagram of a video conference environment in which techniques to automatically calibrate multiple speaker tracking systems with respect to one another may be implemented, according to an example embodiment.

With reference to FIG. 1, there is depicted a block diagram of a video conference environment 100 in which automatic calibration of multiple speaker tracking systems of a collaboration (video conference) endpoint may be implemented based on data points collected by the multiple speaker tracking systems, according to an example embodiment. Video conference environment 100 includes video conference or collaboration endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints 104.

Each video conference endpoint 104 may include more than one speaker tracking system 120(1)-120(N), where speaker tracking system 120(1) includes at least one video camera (VC) 122(1) and speaker tracking system 120(N) includes at least one VC 122(N). Likewise, speaker tracking system 120(1) includes at least one microphone array (MA) 124(1) and speaker tracking system 120(N) includes at least one MA 124(N). Each video conference endpoint 104 may further include at least one display device 126 and a loudspeaker (LDSPKR) 128 coupled to or integrated with the display device 126. In a transmit direction, an endpoint 104 captures audio/video from their local participants 106 with one or more microphone arrays/video cameras, encodes the captured audio/video into data packets, and transmit the data packets to other endpoints or to the conference server 102. In a receive direction, an endpoint 104 decodes audio/video from data packets received from the conference server 102 or other endpoints and presents the audio/video to their local participants 106 via display device 126/loudspeaker 128.

Figure 2:
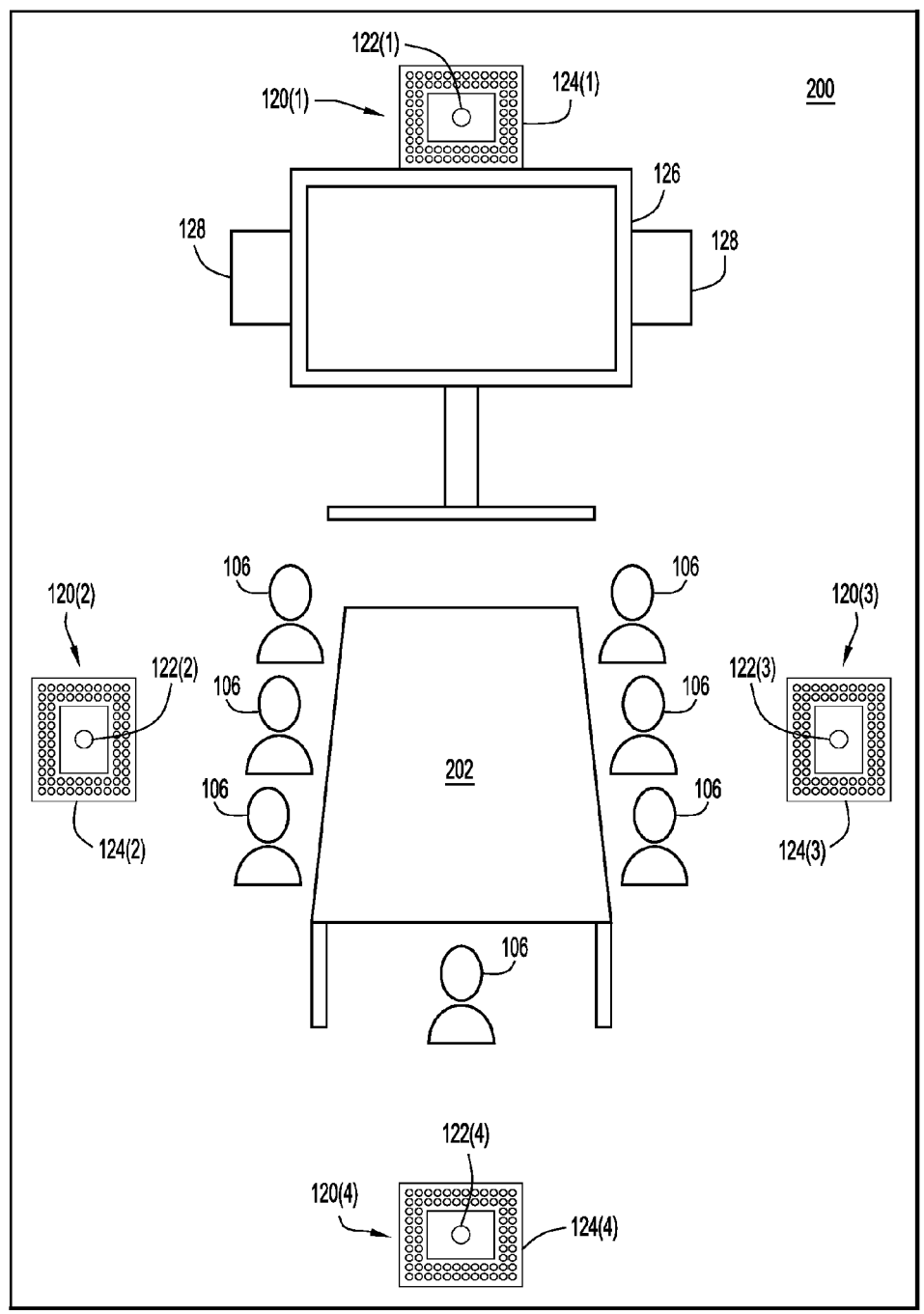
FIG. 2 is an illustration of a video conference endpoint deployed in a conference room and configured to perform techniques presented herein, according to an example embodiment.

Referring now to FIG. 2, there is depicted an illustration of video conference endpoint 104 deployed in a conference room 200. The conference room 200 is depicted simplistically as an outline in FIG. 2. Video conference endpoint 104 includes a main display device 126 positioned on one end of the conference room 200, where, integrated with the display device 126 are loudspeakers 128. Display device 126 may be a screen configured to display content from video sources. It should also be appreciated that the loudspeakers 128 may be disposed in any location within or around the edge/frame of the display device 126, including, but not limited to, centrally along the bottom edge of the frame of the display device 126, the bottom corners of the display device 126, etc. In other embodiments, the loudspeakers 128 may be attached or mounted in close proximity to the display device 128. Thus, the loudspeakers 128 are configured to generate audio projected in the same direction that the display device 126 displays video content. In other words, the loudspeakers 128 may be integrated with the display device 126 such that the audio outputs generated by the loudspeakers 128 originate from approximately the same location in which the content of the video sources are displayed.

Furthermore, disposed adjacent to/coupled to display device 126 is a first speaker tracking system 120(1), which includes camera 122(1) and microphone array 124(1). In some forms, the first speaker tracking system 120(1) may be integrated with the display device 126. The video conference endpoint 104 further includes a second speaker tracking system 120(2) disposed on a wall of the conference room 200 (i.e., a wall that is perpendicular to that of the display device 126) and spaced from the display device 126, and a third speaker tracking system 120(3) may be disposed on another wall that is opposite of the second speaker tracking system 120(2). As illustrated in FIG. 2, the video conference endpoint 104 may also include a fourth speaker tracking system 120(4) disposed at the end of the conference room 200 that is opposite of the display device 126 and the first speaker tracking system 120(1). The second, third, and fourth speaker tracking systems 120(2)-120(4) include cameras 122(2)-122(4), respectively, and microphone arrays 124(2)-124(4), respectively. In some embodiments, the microphone arrays 124(1)-124(4) may be integrated with the cameras 122(1)-122(4), respectively. Cameras 122(1)-122(4) are each operated under control of endpoint 104 to capture video of different views or scenes of participants 106 seated around a table 202, for example. Each of cameras 122(1)-122(4) may include pan, tilt, and zoom (PTZ) features that may be implemented mechanically and/or digitally. Furthermore, the microphone arrays 124(1)-124(4) are positioned adjacent to, or integrated with (or otherwise in a known predetermined physical relationship to), respective ones of the cameras 122(1)-122(4). In one embodiment, microphone arrays 124(1)-124(4) may be planar microphone arrays. The speaker tracking systems 120(1)-120(4) depicted in FIG. 2 are one example of many possible speaker tracking system combinations that may be used, as would be appreciated by one of ordinary skill in the relevant art (i.e., combining any number of speaker tracking systems at a collaboration endpoint, positioning the speaker tracking systems at different locations within the conference room, etc.).

It should be further appreciated that the speaker tracking systems 120(1)-120(4) may be repositionable with respect to one another, with respect to the display device 126, and physically within the conference room 200. Thus, each of the speaker tracking systems 120(1)-120(4) shown in FIG. 2 may be repositioned to any location with the conference room 200. In addition, it should be further appreciated that each speaker tracking system 120(1)-120(N) at a collaboration endpoint 104 may be integrated with, or in close proximity to, a display device.

Video conference endpoint 104 uses (i) audio detection techniques to detect audio sources, i.e., an actively speaking participant 106, with the microphone arrays 124(1)-124(4); (ii) face detection techniques to detect faces and associated positions thereof of all the participants 106 with the cameras 122(1)-122(4); (iii) upper body detection techniques to detect the body and associated positions thereof of all the participants 106 with the cameras 122(1)-122(4); and (iv) motion detection techniques to detect the movement of all the participants 106 in association with the video conference endpoint 104 and the conference room 200 with the cameras 122(1)-122(4) to determine the spatial relationship between the various speaker tracking systems 120(1)-120(4). The detected audio sources are then matched to the relevant facial, upper body, and motion detections.

In accordance with techniques presented herein, video conference endpoint 104 automatically calibrates the spatial relationship between respective two or more speaker tracking system of a video conference endpoint 104. In accordance with another embodiment, one of the speaker tracking systems may be configured to automatically calibrate the spatial relationship with respect to others of the speaker tracking systems of the video conference endpoint 104. In yet another embodiment, the video conference server 102 may be configured to automatically calibrate the spatial relationship between two or more of the speaker tracking systems of a video conference endpoint 104. Regardless of which entity calibrates the spatial relationship(s) between two or more of the speaker tracking systems 120(1)-120(N), after the spatial relationship(s) have been calibrated, the video conference endpoint 104 may then utilize the spatial relationship(s) of the speaker tracking systems to automatically determine which of the video feeds of the cameras 122(1)-122(4) of the speaker tracking systems 120(1)-120(4) to use to best frame the active speaker for the video feed that is sent to one or more other video conference endpoints during a collaboration session.

Figure 3A:
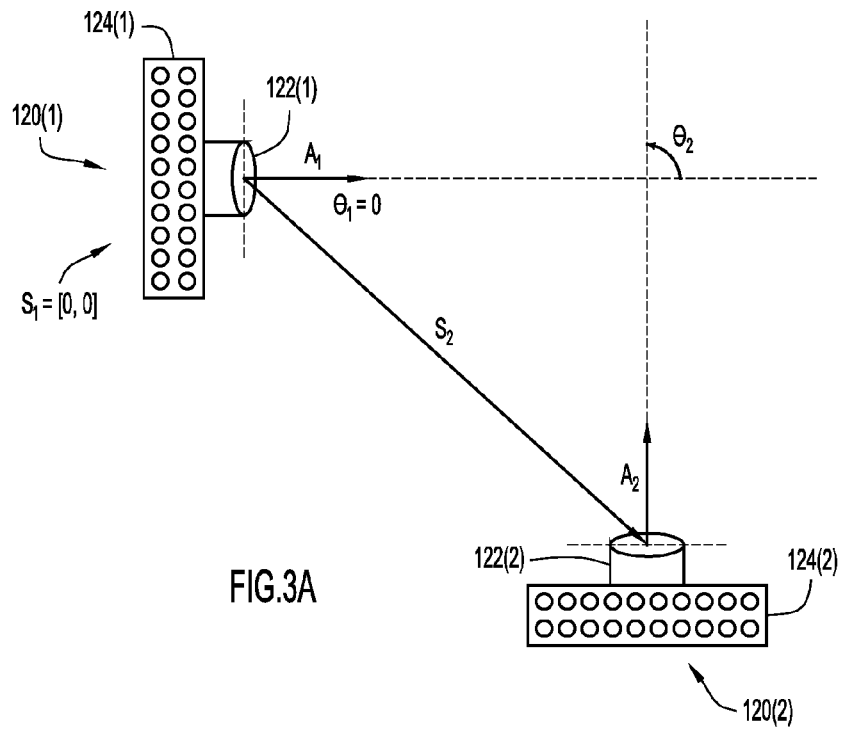
FIG. 3A is a top view of a plurality of speaker tracking systems of a video conference endpoint that depicts the spatial orientation of the speaker tracking systems with respect to one another, according to an example embodiment.

Referring now to FIG. 3A, there is depicted a graphical representation of the spatial relationship between a first speaker tracking system 120(1) and a second speaker tracking system 120(2). As previously explained, each speaker tracking system 120(1), 120(2) includes a camera 122(1), 122(2) and a microphone array 124(1), 124(2), respectively. When determining or calibrating the spatial relationship between speaker tracking systems 120(1), 120(2), a reference coordinate system is created. As illustrated in FIG. 3A, the first speaker tracking system 120(1) is designated as a master speaker tracking system, and thus the first speaker tracking system 120(1) serves as the reference point or origin of the reference coordinate system. The first speaker tracking system 120(1) is assigned a reference point $S_1$ with coordinates [0,0]. Furthermore, the first speaker tracking system 120(1) is facing a direction $A_1$ (i.e., the normal of the first speaker tracking system 120(1)), which serves as reference angle $\theta_1$ and has a value of zero in the reference coordinate system. As illustrated, the second speaker tracking system 120(2) is located at position $S_2$ and is facing a direction $A_2$ (i.e., the normal of the second speaker tracking system 120(2)), which is offset from the reference angle $\theta_1$ (or offset from the direction $A_1$ in which the first speaker tracking system 120(1) is pointed/facing) by an offset angle θ2. In the illustrated embodiment, the second speaker tracking system 120(2) serves as a slave or secondary speaker tracking system to the first speaker tracking system 120(1). Thus, in order to determine the location of the second speaker tracking system 120(2) with respect to the first speaker tracking system 120(1), the values of position $S_2$ and offset angle θ2 are calculated.

In order to calculate the location of a speaker tracking system with respect to another, the speaker tracking systems simultaneously collects a series of data samples that can be used as data points. More specifically, each speaker tracking system 120(1), 120(2) simultaneously collects a set of data samples from the same active speaker or actively speaking participant 106 at the video conference endpoint 104. As previously explained, each speaker tracking system is configured to detect an active speaker through audio detection techniques with the microphone arrays 124(1), 124(2), face and/or upper body detection techniques with the cameras 122(1), 122(2), and motion detection techniques with the cameras 122(1), 122(2). The face, upper, and motion detected by the cameras 122(1), 122(2) may be processed into visual tracks by the speaker tracking systems 120(1), 120(2) that represent the active speaker at a point in space. An approximate distance estimate can be formed for each of the visual tracks based on the detected face and/or upper body. The visual tracks may also be used by the speaker tracking systems 120(1), 120(2) to determine an estimated offset angle of the active speaker with respect to the directions $A_1$, $A_2$ of the cameras 122(1), 122(2), respectively. The speaker tracking systems 120(1), 120(2) may match the audio detected via the microphone arrays 124(1), 124(2), respectively, to the visual tracks to determine a more accurate distance estimation of the active speaker from the speaker tracking systems 120(1), 120(2), respectively. Combining the audio detections with the created visual tracks increases the probability that the data collected by each speaker tracking system 120(1), 120(2) represents the active speaker.

Figure 3B:
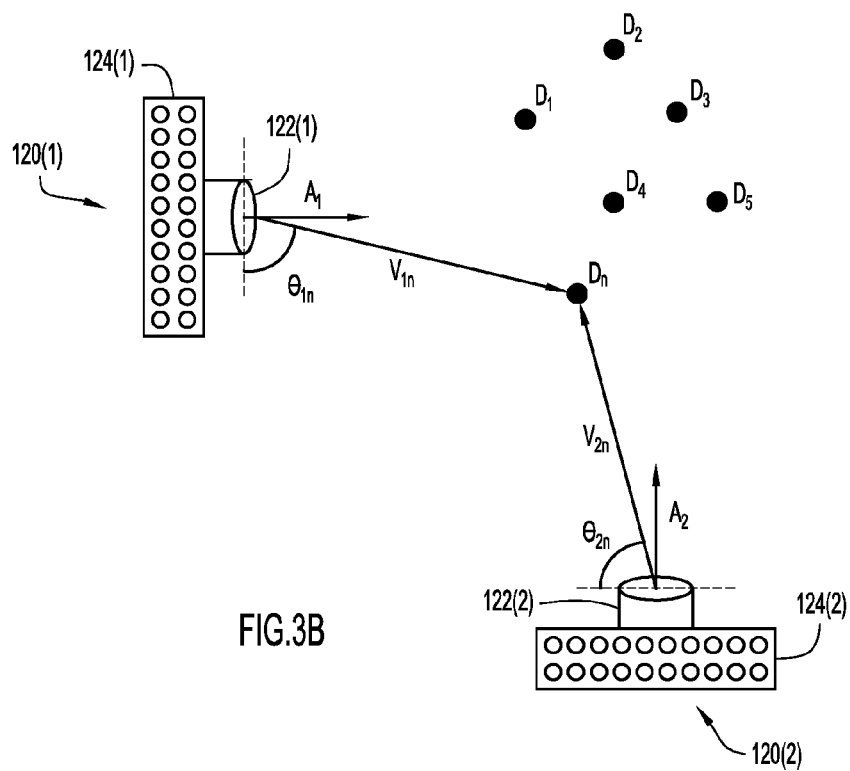
FIG. 3B is a top view of the plurality of speaker tracking systems of a video conference endpoint illustrated in FIG. 3A, where the speaker tracking systems are simultaneously measuring a series of data points, according to an example embodiment.

As illustrated in FIG. 3B, the first speaker tracking system 120(1) and the second speaker tracking system 120(2) have simultaneously collected a series of data points $D_1$-$D_n$. Each of the data points $D_1$-$D_n$ illustrated in FIG. 3B represent detection of an active speaker at the video conference endpoint 104 at a different point in time, where each data point $D_1$-$D_n$ represents sample data collected at the first speaker tracking system 120(1) that has been matched with the sample data collected at the second speaker tracking system 120(2). In order to match sample data collected by the speaker tracking systems 120(1), 120(2), the sample data should occur within a predetermined period of time of one another. For each data point $D_1$-$D_n$, each speaker tracking system 120(1), 120(2) may measure/compute a vector from the speaker tracking system 120(1), 120(2) to the data points $D_1$-$D_n$, where each vector may represent a distance and angle(s) (e.g., azimuth and/or elevation) of the data point from the associated speaker tracking system 120(1), 120(2). For example, as illustrated in FIG. 3B, for the nth data point $D_n$, vector $V_{1n}$ represents the measurement of the nth data point $D_n$ from the first speaker tracking system 120(1) in the reference coordinate system, and vector $V_{2n}$ represents the measurement of the nth data point $D_n$ from the second speaker tracking system 120(2) in the reference coordinate system. Furthermore, angular measurement $\theta_{1n}$ represents the angular offset of the nth data point $D_n$ from the direction $A_1$ in which the first speaker tracking system 120(1) is facing, and angular measurement $\theta_{2n}$ represents the angular offset of the nth data point $D_n$ from the direction $A_2$ in which the second speaker tracking system 120(2) is facing.

In order to define at least a two dimensional position of an active speaker within regard to each speaker tracking system 120(1), 120(2), at least two data points are used. However, during a typical collaboration session, the speaker tracking systems 120(1), 120(2) may collect hundreds of samples. Furthermore, any speaker tracking system may serve as the master speaker tracking system, and any speaker tracking system may serve as a slave speaker tracking system. Thus, the role of master speaker tracking system may be chosen or assigned at random.

Figure 3C:
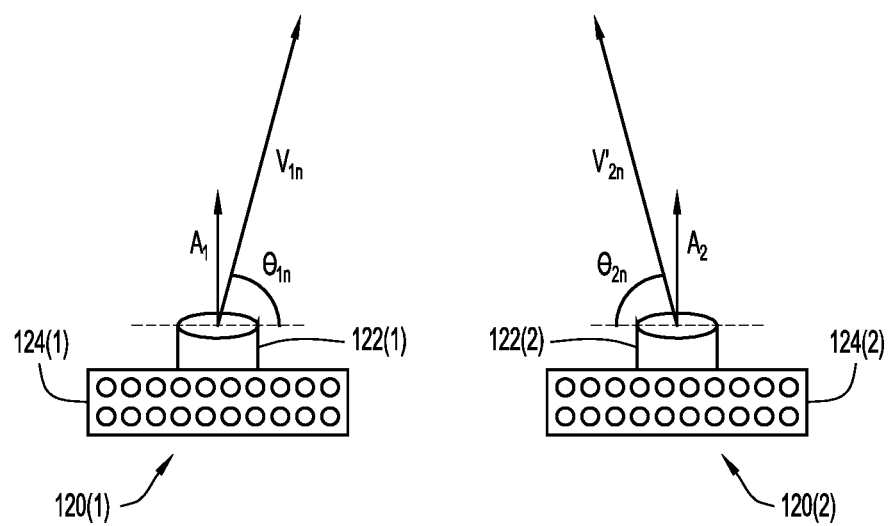
FIG. 3C is an isolated view of the vectors computed by each of the speaker tracking systems illustrated in FIG. 3B, according to an example embodiment.

Turning to FIG. 3C, and with continued reference to FIG. 3B, illustrated is vector $V_{1n}$ of the first speaker tracking system 120(1) and vector $V'_{2n}$ of the second speaker tracking system 120(2) for the nth data point $D_n$, where the vectors $V_{1n}$, $V'_{2n}$ have been isolated from one another and the data points $D_1$-$D_n$. Vector $V_{2n}$ represents the measurement of the nth data point $D_n$ from the second speaker tracking system 120(2) in the reference coordinate system, where the first speaker tracking system 120(1) is the origin of the reference coordinate system. Vector $V'_{2n}$ represents the measurement of the nth data point $D_n$ from the second speaker tracking system 120(2), where the second speaker tracking system 120(2) is the origin of a coordinate system. Thus, vector $V_{2n}$ is the measured vector for the nth data point $D_n$ from the second speaker tracking system rotated $\theta_2$ degrees. Equation (1) below represents the relationship between vector $V'_{2n}$ and vector $V_{2n}$.

$$V_{2n}=R(\theta_2)*V'_{2n}, \quad (1)$$

where $R(\theta_2)$ is the rotational matrix rotating a vector $\theta_2$ degrees.

In order to calculate the location $[S_2, \theta_2]$ for the second speaker tracking system 120(2) in the reference coordinate system, the relationship between the measured vectors $V_{1n}$, $V_{2n}$ is established. Equation (2) below represents the relationship between vector $V_{1n}$ and vector $V_{2n}$.

$$V_{1n}=S_2+V_{2n}, \quad (2)$$

where n∈[1,N] for N equations.

Substituting equation (1) for $V_{2n}$ in equation (2) provides solvable equation (3) below:

$$V_{1n}=S_2+R(\theta_2)*V'_{2n}, \quad (3)$$

where n∈[1,N] for N equations.

Equation (3) has a unique solution of $[S_2, \theta_2]$, which is solvable using linear algebra when the vector measurements are exact. In some embodiments, however, each speaker tracking system 120(1), 120(2) produces some amount of measurement error, which may involve solving equation (3) with an optimization algorithm that minimizes the error E. Equations (4), (5), and (6) below may be used to determine an amount of error E for utilizing an optimization algorithm to solve equation (3) above.

$$E=RMS(e), \quad (4)$$

where RMS(x) is the root-mean-square value, and e is a vector.

$$e=[e_1,e_2,\ldots,e_n,\ldots,e_N], \quad (5)$$

where $e_n$ is the distance between the measured location of the nth data point $D_n$ by the first speaker tracking system 120(1) and the measured location of the nth data point $D_n$ by the second speaker tracking system 120(2) given the solution of $[S_2, \theta_2]$.

Substituting the known relationship equation between vector $V_{1n}$ and vector $V_{2n}$ produces final equation (6) below:

$$e_n=|e_n|=|V_{1n}-(S_2+R(\theta_2)*V'_{2n})|. \quad (6)$$

An optimization algorithm, such as, but not limited to, a gradient descent algorithm, may be used to solve equation (6) to find an optimal solution of $[S_2, \theta_2]$ that minimizes the error for each of the data points $D_1$-$D_n$. While the calibration method and equations described above calculates the relative positions between two speaker tracking systems 120(1), 120(2), it should be appreciated that the calibration method and equations can be of utilized to calibrate more than two speaker tracking systems 120(1)-120(N) by calibrating all of the speaker tracking systems 120(1)-120(N) in pairs and transforming all coordinates to a common coordinate system. Moreover, if the data points $D_1$-$D_n$ are collected using a sliding window of a predetermined time period, the solution will be able to dynamically detect and correct changes to the relative locations and orientations in the speaker tracking systems 120(1)-120(N). Furthermore, while FIGS. 3A-3C illustrate the techniques for calibrating the spatial relationship between two speaker tracking system of a video conference endpoint 104 in two dimensions, it should be appreciated that the same or similar techniques may be used to calibrate the spatial relationship between two or more speaker tracking systems in three dimensions.

Figure 4:
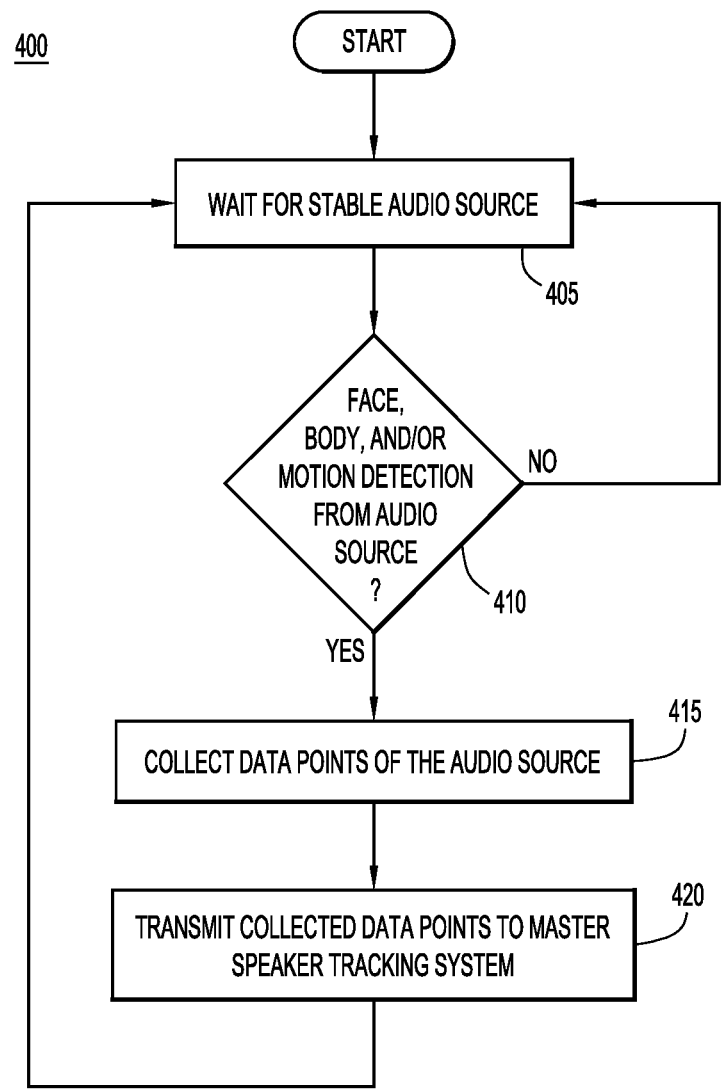
FIG. 4 is a flow chart of a method for generating a series of data points by a secondary speaker tracking system, according to an example embodiment.

With reference to FIG. 4, and continued reference to FIGS. 1, 2, and 3A-3C, illustrated is a flow chart of operations of a method 400 performed by at least one of the secondary speaker tracking systems 120(2)-120(N) for measuring data points $D_1$-$D_n$ and sending the measured data points $D_1$-$D_n$ to the master speaker tracking system 120(1). Initially, at 405, the secondary speaker tracking system 120(2)-120(N) waits for a stable audio source, such as an active speaking participant or active speaker 106 at the collaboration endpoint 104. At 410, the secondary speaker tracking system 120(2)-120(N) determines whether it has detected a face, a body, and/or motion from the active speaker by the camera 122(2)-122(N). If, at 410, the secondary speaker tracking system 120(2)-120(N) does not detect the face, the body, and/or motion of an active speaker, the secondary speaker tracking system 120(2)-120(N) returns to 405 to wait for a stable audio source. However, if, at 410, the secondary speaker tracking system 120(2)-120(N) does detect the face, the body, and/or motion of an active speaker, the secondary speaker tracking system 120(2)-120(N), at 415, collects data points of the active speaker. As previously explained, the secondary speaker tracking system 120(2)-120(N) collects data points $D_1$-$D_n$ through audio detection techniques with the microphone arrays 124(2)-124(N), face and/or upper body detection techniques with the cameras 122(2)-122(N), and motion detection techniques with the cameras 122(2)-122(N). Finally, at 420, the secondary speaker tracking system 120(2)-120(N) transmits the collected data points $D_1$-$D_n$ to the master speaker tracking system 120(1). The secondary speaker tracking system 120(2)-120(N) then returns to 405 to wait for another stable audio source.

Figure 5:
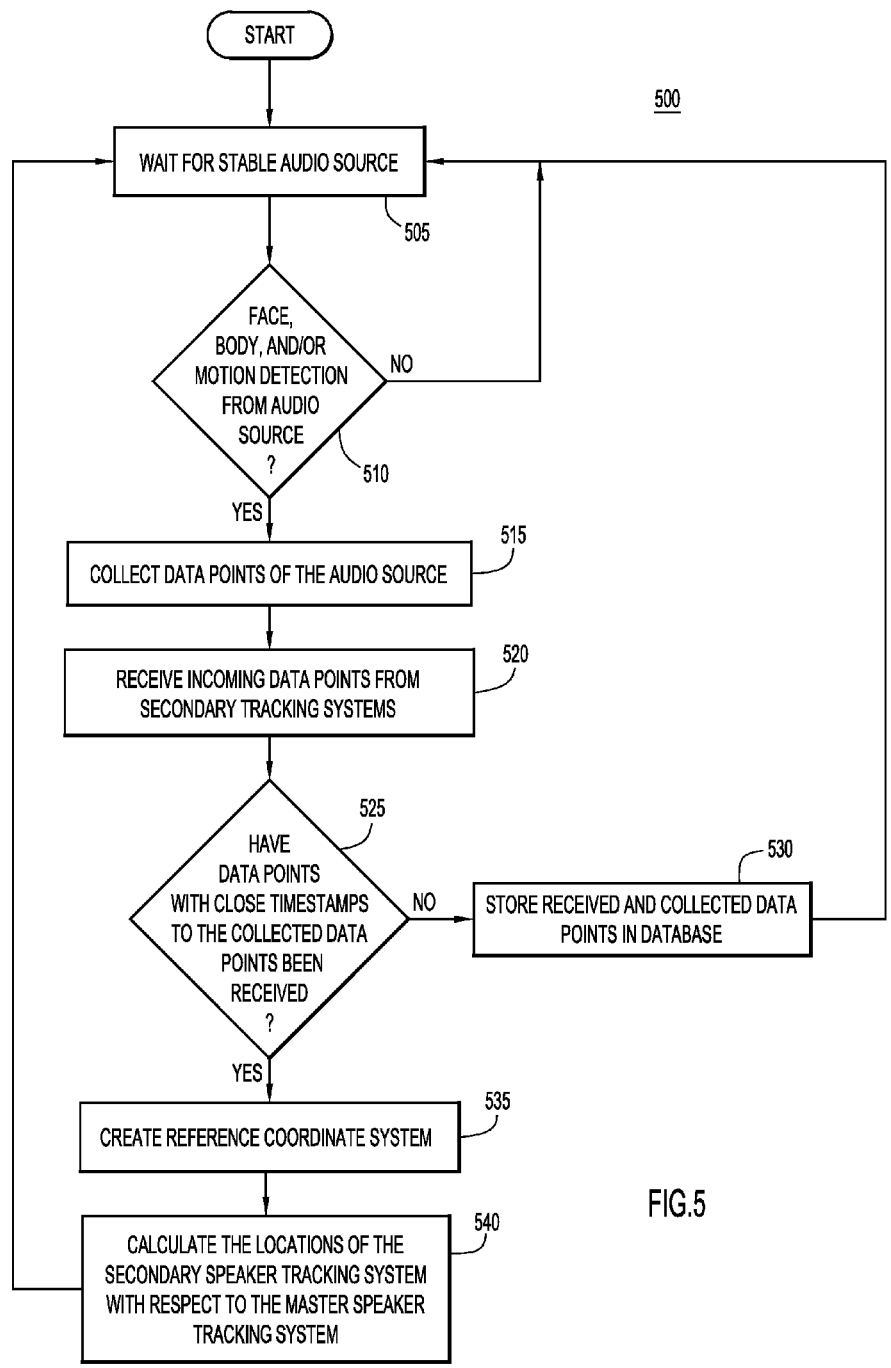
FIG. 5 is a flow chart of a method for calibrating the plurality of speaker tracking systems by a master speaker tracking system, according to an example embodiment.

With reference to FIG. 5, and continued reference to FIGS. 1, 2, 3A-3C, and 4, illustrated is a flow chart of operations of a method 500 performed by a master speaker tracking system 120(1) for measuring data points $D_1$-$D_n$ and calculating the reference coordinate system for determining the location of the secondary speaker tracking systems 120(2)-120(N) with respect to the master speaker tracking system 120(1). Initially, at 505, the master speaker tracking system 120(1) waits for a stable audio source, such as an active speaking participant 106 at the collaboration endpoint 104. At 510, the master speaker tracking system 120(1) determines whether it has detected a face, a body, and/or motion from the active speaker by the camera 122(1). If, at 510, the master speaker tracking system 120(1) does not detect the face, the body, or motion of an active speaker, the master speaker tracking system 120(1) returns to 505 to wait for a stable audio source. However, if, at 510, the master speaker tracking system 120(1) does detect the face, the body, and/or motion of an active speaker, the master speaker tracking system 120(1), at 515, collects data points of the active speaker. As previously explained, the master speaker tracking system 120(1) collects data points $D_1$-$D_n$ through audio detection techniques with the microphone array 124(1), face and/or upper body detection techniques with the camera 122(1), and motion detection techniques with the camera 122(1).

At 520, the master speaker tracking system 120(1) receives the data points $D_1$-$D_n$ collected and measured from each of the secondary speaker tracking systems 120(2)-120(N). The master speaker tracking system 120(1) then, at 525, determines whether the data points $D_1$-$D_n$ received from the secondary speaker tracking systems 120(2)-120(N) have timestamps within a predetermined period of time to the data points $D_1$-$D_n$ collected by the master speaker tracking system 120(1). If, at 525, the master speaker tracking system 120(1) determines that the data points $D_1$-$D_n$ received from the secondary speaker tracking system 120(2)-120(N) do not contain a timestamp within a predetermined period of time to the data points $D_1$-$D_n$ collected by the master speaker tracking system 120(1), the master speaker tracking system 120(1), at 530, stores the received and collected data points $D_1$-$D_n$ in a database. However, if, at 525, the master speaker tracking system 120(1) determines that the data points $D_1$-$D_n$ received from the secondary speaker tracking system 120(2)-120(N) do contain a timestamp within a predetermined period of time to the data points $D_1$-$D_n$ collected by the master speaker tracking system 120(1), the master speaker tracking system 120(1), at 535, creates a reference coordinate system. As explained above, the master speaker tracking system 120(1) may serve as the origin of the reference coordinate system. Then, at 540, the master speaker tracking system 120(1) may utilize linear algebra or optimization algorithms, as explained above, to calculate the locations of the secondary speaker tracking systems 120(2)-120(N) within the reference coordinate system and with respect to the master speaker tracking system 120(1).

Figure 6:
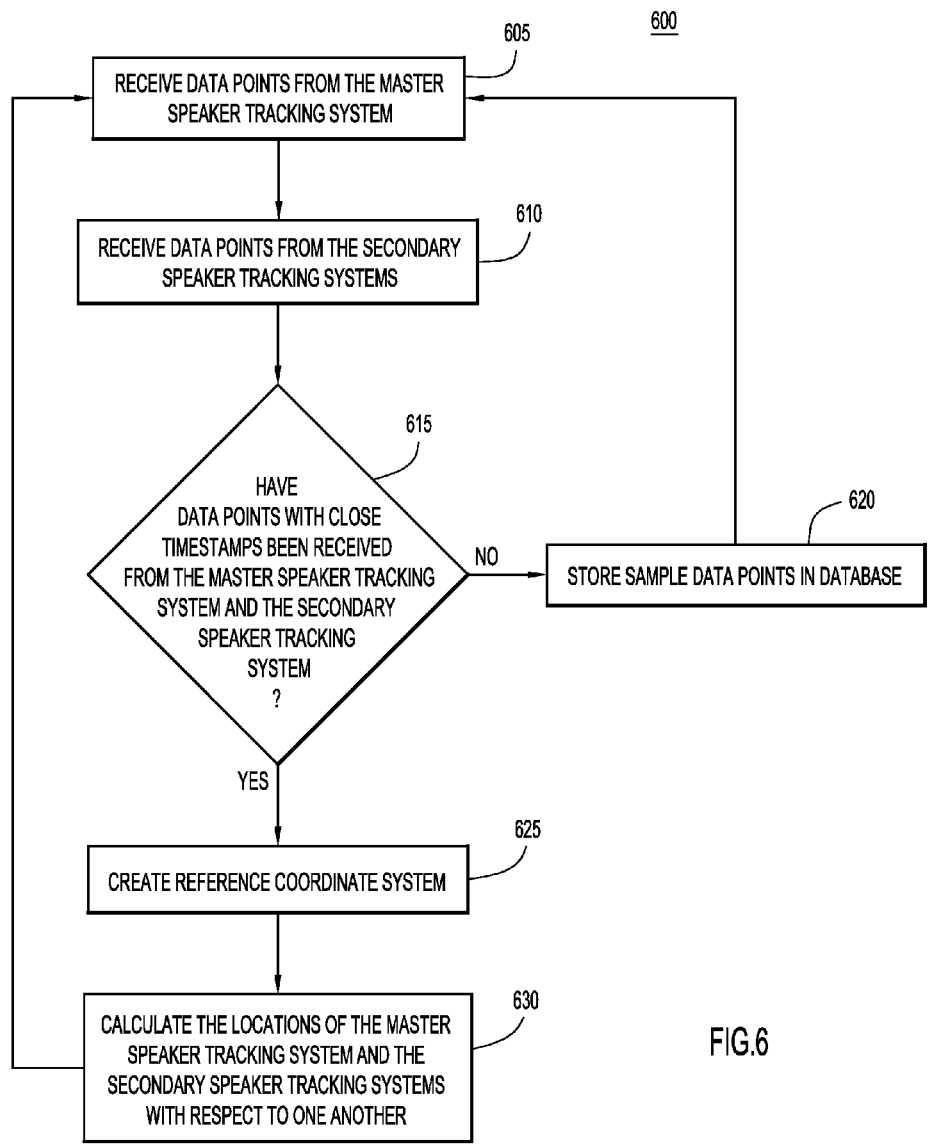
FIG. 6 is a flow chart of another method for calibrating the plurality of speaker tracking systems, according to an example embodiment.

With reference to FIG. 6, and continued reference to FIGS. 1, 2, 3A-3C, 4, and 5 illustrated is a flow chart of operations of a method 600 performed by either the video conference endpoint 104 or the conference server 102 for generating the reference coordinate system and for determining the location of the secondary speaker tracking systems 120(2)-120(N) with respect to the master speaker tracking system 120(1). In one embodiment, the video conference endpoint 104 or the conference server 102 may calculate the reference coordinate system and the locations of the speaker tracking systems 120(1)-120(N) rather than the master speaker tracking system 120(1), as illustrated in FIG. 5. Further still, the computations may be shared by or distributed between the master speaking tracking system/ video conference endpoint and the conference server.

Initially, at 605, the conference server 102 or the video conference endpoint 104 receives the data points $D_1$-$D_n$ collected and measured by the master speaker tracking system 120(1). Furthermore, at 610, the conference server 102 or the video conference endpoint 104 receives the data points $D_1$-$D_n$ collected and measured by each of the secondary speaker tracking systems 120(2)-120(N). The conference server 102 or the video conference endpoint 104 then, at 615, determines whether the data points $D_1$-$D_n$ received from the secondary speaker tracking systems 120(2)-120(N) have timestamps within a predetermined period of time to the data points $D_1$-$D_n$ received from the master speaker tracking system 120(1). If, at 615, the conference server 102 or the video conference endpoint 104 determines that the data points $D_1$-$D_n$ received from the secondary speaker tracking system 120(2)-120(N) do not contain a timestamp within a predetermined period of time to the data points $D_1$-$D_n$ received from the master speaker tracking system 120(1), the conference server 102 or the video conference endpoint 104, at 620, stores the data points $D_1$-$D_n$ in a database. However, if, at 615, the conference server 102 or the video conference endpoint 104 determines that the data points $D_1$-$D_n$ received from the secondary speaker tracking system 120(2)-120(N) do contain a timestamp within a predetermined period of time to the data points $D_1$-$D_n$ received by the master speaker tracking system 120(1), the conference server 102 or the video conference endpoint 104, at 625, creates a reference coordinate system. As explained above, the master speaker tracking system 120(1) may serve as the origin of the reference coordinate system. At 630, the conference server 102 or the video conference endpoint 104 may utilize linear algebra or optimization algorithms, as explained above, to calculate the locations of the secondary speaker tracking systems 120(2)-120(N) within the reference coordinate system and with respect to the master speaker tracking system 120(1).

Figure 7:
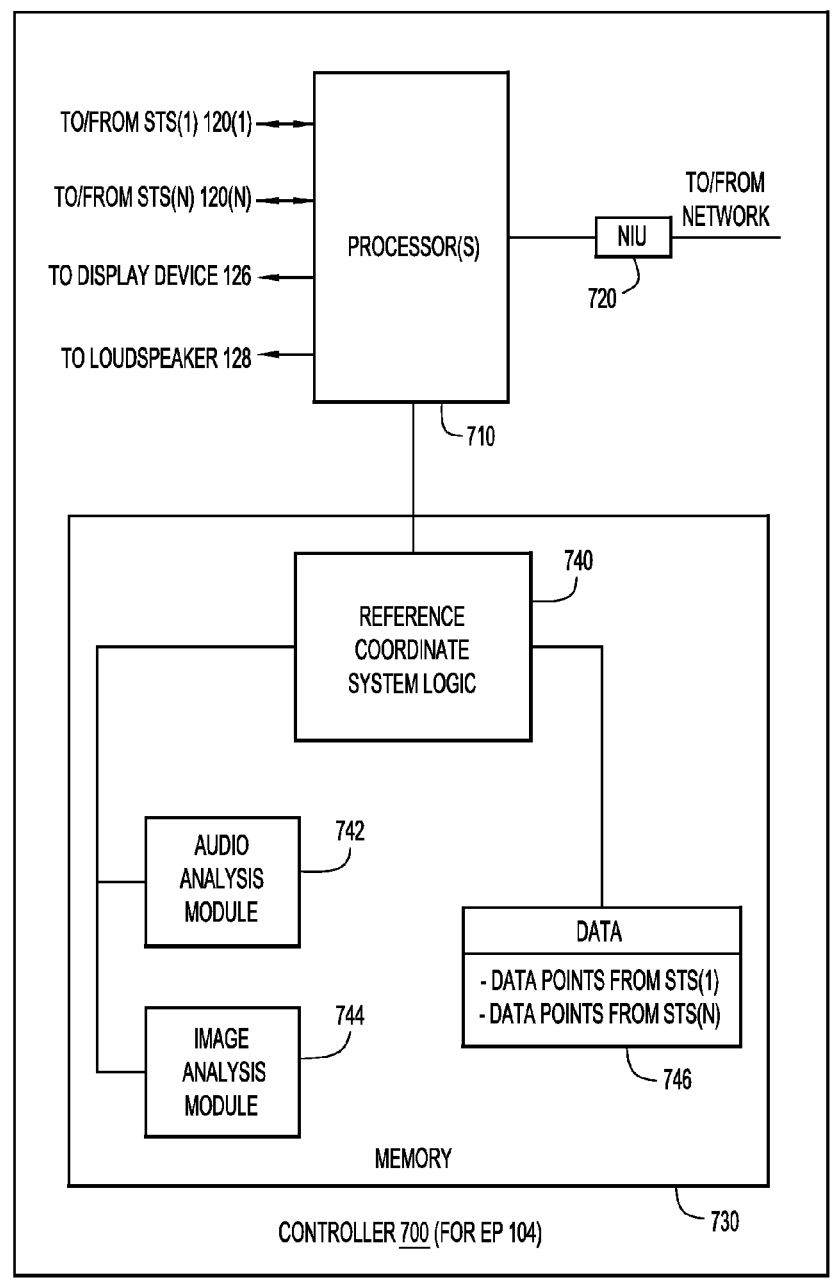
FIG. 7 is a block diagram of an example controller of a video conference endpoint configured to perform techniques described herein, according to an embodiment.

Reference is now made to FIG. 7, which shows an example block diagram of a controller 700 of video conference endpoint 104 configured to perform the techniques for calibrating multiple speaker tracking systems 120(1)-120(N) of the video conference endpoint 104 according to the embodiments described herein. There are numerous possible configurations for controller 700 and FIG. 7 is meant to be an example. Controller 700 includes a processor 710, a network interface unit 720, and memory 730. The network interface (I/F) unit (NIU) 720 is, for example, an Ethernet card or other interface device that allows the controller 700 to communicate over communication network 110. Network I/F unit 720 may include wired and/or wireless connection capability.

Processor 710 may include a collection of microcontrollers and/or microprocessors, for example, each configured to execute respective software instructions stored in the memory 730. The collection of microcontrollers may include, for example: a video controller to receive, send, and process video signals related to display 126 and video cameras 122(1)-122(N) of the speaker tracking systems 120(1)-120(N); an audio processor to receive, send, and process audio signals related to loudspeaker 128 and microphone arrays 124(1)-124(N) of the speaker tracking systems 120(1)-120(N); and a high-level controller to provide overall control. Processor 710 may send pan, tilt, and zoom commands to video cameras 122(1)-122(N), which is responsive to the commands as would be appreciated by one of ordinary skill in the relevant art. Portions of memory 730 (and the instruction therein) may be integrated with processor 710. In the transmit direction, processor 710 encodes audio/video captured by video cameras 122(1)-122(N)/microphone arrays 124(1)-124(N), encodes the captured audio/video into data packets, and causes the encoded data packets to be transmitted to communication network 110. In a receive direction, processor 710 decodes audio/video from data packets received from communication network 110 and causes the audio/video to be presented to local participants 106 via display 126/loudspeaker 128. As used herein, the terms "audio" and "sound" are synonymous and interchangeable.

The memory 730 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 730 may comprise one or more computer readable storage media (e.g., a memory device) encoded with software comprising computer executable instructions and when the software is executed (by the processor 710) it is operable to perform the operations described herein. For example, the memory 730 stores or is encoded with instructions for reference coordinate system logic 740 for establishing a reference coordinate system and calibrating the speaker tracking systems 120(1)-120(N) with one another by determining their locations within the reference coordinate system. Reference coordinate system logic 740 includes an audio analysis module 742 to analyze the detected audio sources at the video conference endpoint 104 using microphone arrays 124(1)-124(N) of the speaker tracking systems 120(1)-120(N) and an image analysis module 744 to analyze the detected faces, bodies, and/or motions of an active speaker at the video conference endpoint 104 using cameras 122(1)-122(N) of the speaker tracking systems 120(1)-120(N). The audio analysis module 742 and the image analysis module 744 further enable the calculation of the distance and angular offsets of the detected active speaker with respect to each of the speaker tracking systems 120(1)-120(N).

In addition, memory 730 stores data 746 used and generated by logic/modules/detectors 740, 742, 744, including, but not limited to: data points (i.e., vectors, angles, distances, etc.) measured and received by a master speaker tracking system 120(1); and data points (i.e., vectors, angles, distances, etc.) measured and received by the secondary speaker tracking systems 120(2)-120(N).

Figure 8:
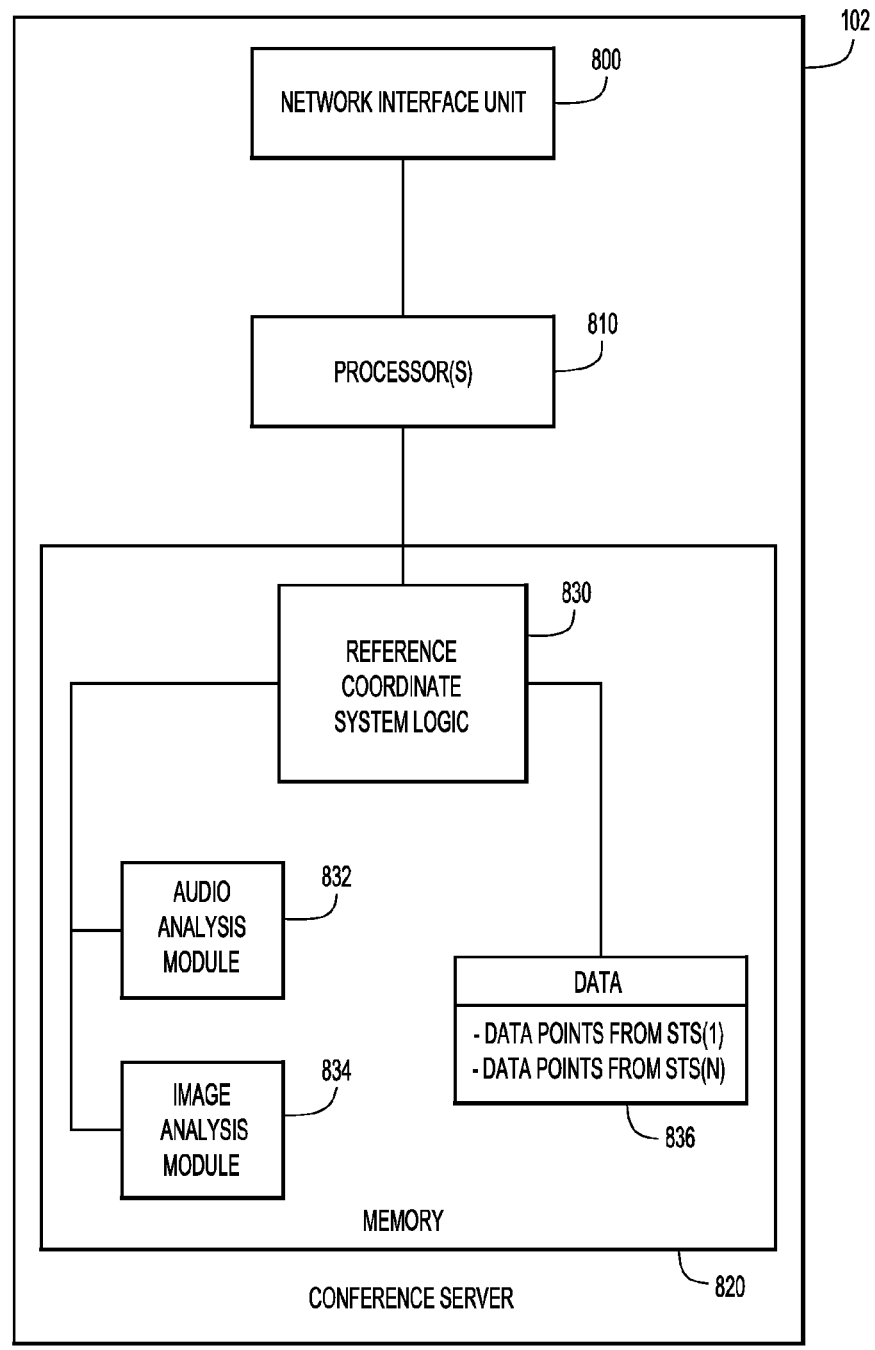
FIG. 8 is a block diagram of an example video conference server configured to perform techniques described herein, according to an embodiment.

Illustrated in FIG. 8 is an example block diagram of the conference server 102 configured to perform the techniques presented herein. As shown, the conference server 102 includes a network interface unit 800, one or more processor(s) 810, and a memory 820. The network interface (I/F) unit (NIU) 800 is, for example, an Ethernet card or other interface device that allows the server 102 to communicate over communication network 110. Network I/F unit 800 may include wired and/or wireless connection capability. The network interface unit 800 may include a plurality of ports at which it can receive incoming network traffic and from which it can send outgoing network traffic (i.e., to each of the conference endpoints 104). While conceptually illustrated as a "network interface unit," it will be appreciated that a physical device may contain more than one network interface unit or type of interface to communicate with other devices within a network.

The processor(s) 810 may be embodied by one or more microprocessors or microcontrollers, and execute software instructions stored in memory 820 for the reference coordinate system logic 830, the audio analysis module 832, and the image analysis module 834 in accordance with the techniques presented herein in connection with FIGS. 1, 2, 3A-3C, 4, 5, and 6.

Memory 820 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 820 may include one or more tangible (e.g., non-transitory) computer readable storage media (e.g., a memory device) encoded with software comprising computer executable instructions, and when the software is executed by the processor(s) 810, the processor(s) 810 are operable to perform the operations described herein by executing instructions associated with the reference coordinate system logic 830, the audio analysis module 832, and the image analysis module 834. In other approaches, reference coordinate system logic 830, the audio analysis module 832, and the image analysis module

834 may be stored remotely, external to the conference server 102, but accessible by the processor(s) 810. The reference coordinate system logic 830 enables the conference server 102 to establish a reference coordinate system and calibrate the speaker tracking systems with one another by determining their locations within the reference coordinate system. As illustrated, the reference coordinate system logic 830 includes an audio analysis module 832 that enables the conference server 102 to analyze the detected active speaker at the video conference endpoint 104 through the microphone arrays 124(1)-124(N) of the speaker tracking systems 120(1)-120(N). The reference coordinate system logic 830 further includes an image analysis module 834 that enables the conference server 102 to analyze the faces, bodies, and/or motions of an active speaker that are detected with cameras 122(1)-122(N) of the speaker tracking systems 120(1)-120(N). The audio analysis module 832 and the image analysis module 834 may further enable the conference server 102 to calculate the distance and angular offsets of the detected active speaker with respect to each of the speaker tracking systems 120(1)-120(N).

In addition, memory 820 stores data 836 used and generated by logic/modules/detectors 830, 832, 834, including, but not limited to: data points (i.e., vectors, angles, distances, etc.) measured and received by a master speaker tracking system 120(1); and data points (i.e., vectors, angles, distances, etc.) measured and received by the secondary speaker tracking systems 120(2)-120(N).

The functions of the processor(s) 810 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 8 shows that the conference server 102 may be embodied as a dedicated physical device, it should be understand that the functions of the conference server 102 may be embodied as software running in a data center/cloud computing system, together with numerous other software applications.

Figure 9:
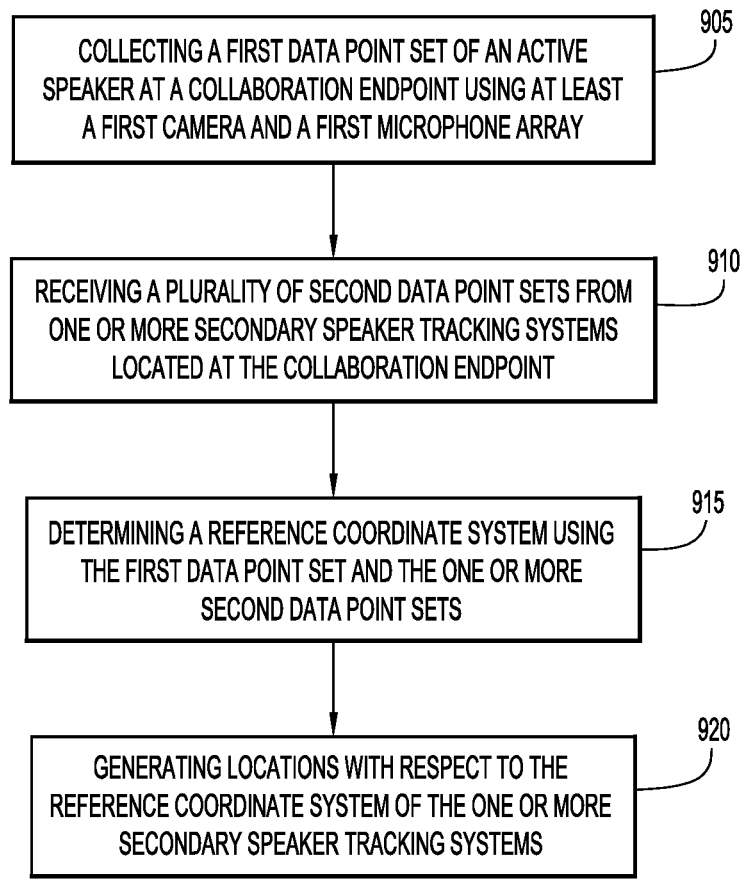
FIG. 9 is a flowchart of a method of calculating the spatial location of a second speaker tracking system with respect to a first speaker tracking system, according to an example embodiment.

With reference to FIG. 9, illustrated is a flow chart of a method 900 for establishing a reference coordinate system between multiple speaker tracking systems of a video conference endpoint 104 and for calculating the locations of the multiple speaker tracking systems in the reference coordinate system to enable the multiple speaker tracking systems to be calibrated with respect to one another. Reference is also made to FIGS. 1, 2, 3A-3C, and 4-8 for purposes of the description of FIG. 9. At 905, a first data point set is collected, where the first data point set contains data points that represent an active speaker at the collaboration endpoint 104 at various points in time. In some embodiments, the first data point set may be collected by a camera 122(1) and microphone array 124(1) of the first speaker tracking system 120(1). At 910, a plurality of second data point sets are received from one or more secondary speaker tracking systems 120(2)-120(N) that are located at the collaboration endpoint 104. The plurality of second data point sets are collected by the secondary speaker tracking systems 120(2)-120(N) via cameras 122(2)-122(N), respectively, and microphone arrays 124(2)-124(N), respectively. At 915, a reference coordinate system may be determined using the first data point set and the one or more second data point sets. The first data point set includes an indication of a distance of the active speaker from the first speaker tracking system and an angle of the active speaker with respect to a normal of the first speaker tracking system at various points in time. Furthermore, each of the one or more second data point sets includes an indication of a distance of the active speaker from a respective secondary speaker tracking system and an angle of the active speaker with respect to a normal of the respective secondary speaker tracking system at various points in time. At 920, the locations of the one or more secondary speaker tracking systems with respect to the first speaker tracking system are generated. Generating the locations of the one or more secondary speaker tracking systems may be based on the reference coordinate system, the first data point set, and the one or more second data point sets.

In summary, the environment described above enables the data received from each speaker tracking system of a video conference endpoint to be dynamically and automatically utilized to continuously calibrate the multiple speaker tracking systems of a collaboration endpoint. The environment described above further enables the repositionable placement of speaker tracking systems within a conference room without requiring time consuming manual calibration of the systems. This allows each conference room to be easily and quickly reconfigured for each meeting. In other words, the automatic calibration of the speaker tracking systems permits each speaker tracking system to be repositionable around the collaboration endpoint and/or around the conference room. Furthermore, by utilizing both visual detections (e.g., facial, body, and/or motion) and audio detections of an active speaker to calibrate the multiple speaker tracking systems, the calibration is not subject to scene variations and lighting conditions. Moreover, the data utilized to calibrate the multiple speaker tracking systems is data that is already calculated by each speaker tracking system, removing the need for intensive CPU operations to calibrate the multiple speaker tracking systems. The environment described above eliminates the need to manually calibrate the multiple speaker tracking systems, which relieves the burden on the participants and/or any administrators in calibrating the multiple speaker tracking systems.

In one form, a method is provided comprising: collecting a first data point set of an active speaker at a collaboration endpoint using at least a first camera and a first microphone array; receiving a plurality of second data point sets from one or more secondary speaker tracking systems located at the collaboration endpoint; determining a reference coordinate system using the first data point set and the one or more second data point sets; and generating locations of the one or more secondary speaker tracking systems with respect to a first speaker tracking system.

In another form, an apparatus is provided comprising: a network interface unit configured to enable communications over a network; and a processor coupled to the network interface unit, the processor configured to: receive a first data point set associated with an active speaker detected at a collaboration endpoint with at least a first camera and a first microphone array of the collaboration endpoint; receive a plurality of second data point sets from one or more secondary speaker tracking systems located at the collaboration endpoint; determine a reference coordinate system using the first data point set and the one or more second data point sets; and generate locations with respect to the reference coordinate system of the one or more secondary speaker tracking systems.

In yet another form, a (non-transitory) processor readable medium is provided. The medium stores instructions that, when executed by processor of a first server, cause the processor to: receive a first data point set associated with an active speaker detected at a collaboration endpoint with at least a first camera and a first microphone array of the collaboration endpoint; receive a plurality of second data point sets from one or more secondary speaker tracking systems located at the collaboration endpoint; determine a reference coordinate system using the first data point set and the one or more second data point sets; and generate locations with respect to the reference coordinate system of the one or more secondary speaker tracking systems.

The above description is intended by way of example only. Various modifications and structural changes may be made therein without departing from the scope of the concepts described herein and within the scope and range of equivalents of the claims.

What is claimed is:

1. A method comprising:
collecting a first data point set of an active speaker at a collaboration endpoint using at least a first camera and a first microphone array of a first speaker tracking system located at the collaboration endpoint;
receiving a plurality of second data point sets from one or more secondary speaker tracking systems located at the collaboration endpoint, each secondary speaker tracking system including at least a secondary camera and a secondary microphone array;
determining a reference coordinate system using the first data point set and one or more of the plurality of second data point sets; and
generating locations with respect to the reference coordinate system of the one or more secondary speaker tracking systems.

2. The method of claim 1, wherein collecting the first data point set is performed by the first speaker tracking system.

3. The method of claim 2, wherein receiving a plurality of second data points, determining a reference coordinate system, and generating locations of the one or more secondary speaker tracking systems is performed by the first speaker tracking system.

4. The method of claim 2, wherein receiving a plurality of second data points, determining a reference coordinate system, and generating locations of the one or more secondary speaker tracking systems is performed by a server coupled to the first speaker tracking system and the one or more secondary speaker tracking systems.

5. The method of claim 4, further comprising:
receiving, by the server, the first data point set of the active speaker at the collaboration endpoint from the first speaker tracking system.

6. The method of claim 1, wherein generating the locations of the one or more secondary speaker tracking systems is based on the reference coordinate system, the first data point set, and the plurality of second data point sets.

7. The method of claim 1, wherein the first data point set includes an indication of a distance of the active speaker from the first speaker tracking system and one or more angles of the active speaker with respect to a normal of the first speaker tracking system at a first point in time.

8. The method of claim 7, wherein each of the plurality of second data point sets includes an indication of a distance of the active speaker from a respective secondary speaker tracking system and an angle of the active speaker with respect to a normal of the respective secondary speaker tracking system at the first point in time.

9. An apparatus comprising:
a network interface unit configured to enable communications over a network; and
a processor coupled to the network interface unit, the processor configured to:
receive a first data point set associated with an active speaker detected at a collaboration endpoint with at least a first camera and a first microphone array of a first speaker tracking system located at the collaboration endpoint;
receive a plurality of second data point sets from one or more secondary speaker tracking systems located at the collaboration endpoint, each secondary speaker tracking system including at least a secondary camera and a secondary microphone array;
determine a reference coordinate system using the first data point set and one or more of the plurality of second data point sets; and
generate locations with respect to the reference coordinate system of the one or more secondary speaker tracking systems.

10. The apparatus of claim 9, wherein the processor, when receiving the first data point set, causes the first speaker tracking system to collect the first data point set.

11. The apparatus of claim 10, wherein the processor, when receiving the plurality of second data points, determining a reference coordinate system, and generating locations of the one or more secondary speaker tracking systems, causes the first speaker tracking system to receive the plurality of second data point sets from the one or more secondary speaker tracking systems located at the collaboration endpoint, determine the reference coordinate system using the first data point set and the one or more second data point sets, and generate the locations of the one or more secondary speaker tracking systems with respect to the first speaker tracking system.

12. The apparatus of claim 9, wherein the processor is further configured to:
receive the first data point set of the active speaker at the collaboration endpoint from the first speaker tracking system.

13. The apparatus of claim 9, wherein the processor is configured to generate the locations of the one or more secondary speaker tracking systems based on the reference coordinate system, the first data point set, and the plurality of second data point sets.

14. The apparatus of claim 9, wherein the first data point set includes an indication of a distance of the active speaker from the first speaker tracking system and one or more angles of the active speaker with respect to a normal of the first speaker tracking system at a first point in time.

15. The apparatus of claim 14, wherein each of the plurality of second data point sets includes an indication of a distance of the active speaker from a respective secondary speaker tracking system and an angle of the active speaker with respect to a normal of the respective secondary speaker tracking system at the first point in time.

16. One or more non-transitory computer readable storage media, the computer readable storage media being encoded with software comprising computer executable instructions, and when the software is executed, operable to:
receive a first data point set associated with an active speaker detected at a collaboration endpoint with at least a first camera and a first microphone array of a first speaker tracking system located at the collaboration endpoint;
receive a plurality of second data point sets from one or more secondary speaker tracking systems located at the collaboration endpoint, each secondary speaker tracking system including at least a secondary camera and a secondary microphone array;

determine a reference coordinate system using the first data point set and one or more of the plurality of second data point sets; and generate locations with respect to the reference coordinate system of the one or more secondary speaker tracking systems.

17. The non-transitory computer readable storage media of claim 16, wherein the instructions are further operable to:

receive the first data point set of the active speaker at the collaboration endpoint from the first speaker tracking system.

18. The non-transitory computer readable storage media of claim 16, wherein the instructions are configured to generate the locations of the one or more secondary speaker tracking systems based on the reference coordinate system, the first data point set, and the plurality of second data point sets.

19. The non-transitory computer readable storage media of claim 16, wherein the first data point set includes an indication of a distance of the active speaker from the first speaker tracking system and one or more angles of the active speaker with respect to a normal of the first speaker tracking system at a first point in time.

20. The non-transitory computer readable storage media of claim 19, wherein each of the plurality of second data point sets includes an indication of a distance of the active speaker from a respective secondary speaker tracking system and an angle of the active speaker with respect to a normal of the respective secondary speaker tracking system at the first point in time.

* * * * *